US009832219B2

(12) United States Patent
Hadden et al.

(10) Patent No.: US 9,832,219 B2
(45) Date of Patent: Nov. 28, 2017

(54) SYSTEM FOR TRACKING DATA SECURITY THREATS AND METHOD FOR SAME

(71) Applicant: Resilient Systems, Inc., Cambridge, MA (US)

(72) Inventors: Allen Hadden, Marlborough, MA (US); Kenneth Allen Rogers, Stow, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/743,399

(22) Filed: Jun. 18, 2015

(65) Prior Publication Data

US 2016/0072836 A1 Mar. 10, 2016

Related U.S. Application Data

(60) Provisional application No. 62/046,662, filed on Sep. 5, 2014.

(51) Int. Cl.
*G06F 11/00* (2006.01)
*H04L 29/06* (2006.01)

(52) U.S. Cl.
CPC ........ *H04L 63/1441* (2013.01); *H04L 63/145* (2013.01); *H04L 63/1416* (2013.01); *H04L 63/20* (2013.01)

(58) Field of Classification Search
CPC .................................................. H04L 63/1416
USPC ......................................................... 726/23
See application file for complete search history.

(56) References Cited

U.S. PATENT DOCUMENTS

| 6,678,827 B1* | 1/2004 | Rothermel | H04L 29/06 709/223 |
| 7,127,743 B1 | 10/2006 | Khanolkar et al. | |
| 7,260,844 B1 | 8/2007 | Tidwell et al. | |
| 7,376,969 B1* | 5/2008 | Njemanze | G06F 21/55 709/224 |

(Continued)

OTHER PUBLICATIONS

PCT/US2015/048465 International Search Report and Written Opinion of the International Searching Authority, dated Dec. 1, 2015.

(Continued)

*Primary Examiner* — Teshome Hailu
(74) *Attorney, Agent, or Firm* — Jeffrey S. LaBaw; David H. Judson

(57) ABSTRACT

An incident response system and method for tracking data security incidents in enterprise networks is disclosed. An Incident Manager application (IM) stores incident objects and incident artifacts (IAs) created in response to the incidents, where the incident objects include the information for the incident and the IAs are associated with data resources (e.g. IP addresses and malware hashes) identified within the incident objects. In response to creation of the IAs, the IM issues queries against one or more external threat intelligence sources (TISs) to obtain information associated with the IAs and augments the IAs with the obtained information. In examples, the IM can identify known threats by comparing the contents of IAs against TIS(s) of known threats, and can identify potential trends by correlating the created incident objects and augmented IAs for an incident with incident objects and IAs stored for other incidents.

20 Claims, 7 Drawing Sheets

(56) References Cited

U.S. PATENT DOCUMENTS

| | | | |
|---|---|---|---|
| 7,457,823 B2 | 11/2008 | Shraim et al. | |
| 7,877,804 B2* | 1/2011 | Khanolkar | G06F 21/552 709/223 |
| 8,032,557 B1 | 10/2011 | Vijendra et al. | |
| 8,244,777 B1 | 8/2012 | Vijendra et al. | |
| 8,661,062 B1 | 2/2014 | Jamail et al. | |
| 8,707,445 B2 | 4/2014 | Sher-Jan et al. | |
| 8,763,133 B2 | 6/2014 | Sher-Jan et al. | |
| 8,782,784 B1 | 7/2014 | Bruskin | |
| 8,880,682 B2 | 11/2014 | Bishop et al. | |
| 9,069,930 B1 | 6/2015 | Hart | |
| 9,075,668 B1 | 7/2015 | Hushon et al. | |
| 9,083,734 B1 | 7/2015 | Bishop et al. | |
| 9,152,706 B1 | 10/2015 | Claudatos et al. | |
| 9,215,270 B2 | 12/2015 | Mohaban et al. | |
| 9,258,321 B2* | 2/2016 | Amsler | H04L 63/1425 |
| 2013/0074143 A1 | 3/2013 | Bu et al. | |
| 2013/0124223 A1 | 5/2013 | Gregg | |
| 2013/0332590 A1 | 12/2013 | Mohaban et al. | |
| 2013/0333028 A1* | 12/2013 | Hagar | H04L 63/1416 726/22 |
| 2014/0278664 A1 | 9/2014 | Loomis | |
| 2014/0304822 A1 | 10/2014 | Sher-Jan et al. | |
| 2015/0113663 A1 | 4/2015 | Sher-Jan et al. | |
| 2015/0235164 A1 | 8/2015 | Key | |
| 2015/0242625 A1 | 8/2015 | Cassidy et al. | |
| 2016/0021133 A1 | 1/2016 | Sher-Jan et al. | |
| 2016/0127394 A1 | 5/2016 | Hadden et al. | |

OTHER PUBLICATIONS

BlackStratus SIEMStorm, "Rapidly identify and resolve threats, . . . " www.blackstratus.com, 2012. Four pages.

Domino Project Management, "Track and Control Projects with Lotus Notes," www.trackersuite.com/index, 2013. Two pages.

HP ArcSight Express, "World-Class Protection for the Mid-Size Organization," www.arcsight.com, 2010. Six pages.

Janet Csirt, "RTIR incident handling work-flow," Janet (UK) WI/JCSIRT/002, jisc.ac.uk, 2011. Eighteen pages.

Jarocki, J., "Orion Incident Response Live CD," 2010, Sans Institute, https://www.sans.org. Forty-five pages.

Khurana, H. et al., "Palantir: A Framework for Collaborative Incident Response and Investigation," IDtrust, 2009. Fourteen pages.

QRadar Administration Guide, http://www.q1labs.com, May 2012. 318 pages.

QRadar Users Guide, http://www.q1labs.com, May 2012. 396 pages.

Reddy, K. et al., "The architecture of a digital forensic readiness management system," Computers & Security 32 (2013) 73-89. Seventeen pages.

Swift, D., "A Practical Application of SIM/SEM/SIEM Automating Threat Identification," 2006, SANS Institute 2007. Forty-one pages.

West-Brown, M. et al., "Handbook for Computer Security Incident Response Teams (CSIRTs)," 2nd Edition, Apr. 2003. 223 pages.

\* cited by examiner

SYSTEM FOR TRACKING DATA SECURITY THREATS AND METHOD FOR SAME

RELATED APPLICATIONS

This application claims the benefit under 35 USC 119(e) of U.S. Provisional Application No. 62/046,662, filed on Sep. 5, 2014, which is incorporated herein by reference in its entirety.

BACKGROUND OF THE INVENTION

A data security incident is a general term associated with many different types of unauthorized activity involving devices and/or sensitive data. Examples of devices include computing devices such as laptops, mobile phones, and application servers, and networking devices such as routers and firewalls. Examples of data security incidents include lost or stolen information, lost or stolen devices, devices compromised by malware or accessed without authorization, and internet based cyber attacks.

Internet based cyber attacks upon enterprise networks of organizations can create significant operational problems and serious financial and legal risk for organizations. This is due to the disruption of business and data losses that often result from these attacks. The attacks attempt to exploit security vulnerabilities of operating systems and software running on computers and servers within enterprise networks of the organizations. Attackers exploit these security vulnerabilities to steal proprietary data and confidential client records, and to disrupt business operations by introducing malicious computer programs or launching Denial of Service (DoS) attacks, in examples.

Organizations utilize incident management systems to maintain information about incidents and manage the response to data security incidents. Current incident management systems and methods typically provide the ability for Incident Response Team (IRT) members to track how the institution is responding to incidents.

SUMMARY OF THE INVENTION

Threat Intelligence Sources (TISs) provide knowledge information concerning techniques, data resources, and identities of attackers involved in cyber attacks, in examples. The knowledge information can be used by the IRT to determine if their organization has been the target of a cyber attack. Examples of data resources for which TIS(s) can provide knowledge information include IP addresses of known "command and control" servers used to control malware, file hashes associated with malware, domain names, names of files, user account IDs, registry keys, email addresses, and/or protocol port numbers known to be used by an attacker. TIS(s) are often categorized by the knowledge information that they provide. Specifically, TISs are typically organized into first level TIS(s) and second level TIS(s).

First level TISs typically include lists of known threats of a specific type and return an indication for whether a data resource is associated with a known threat or cyber attack technique. In a typical example, a first level TIS provides a Boolean result based on whether or not the requested data resource (e.g. IP addresses and file hashes) is included within the TIS. In the event of a match or "hit," the data resource is identified to the requestor as a known threat.

Second level TIS(s) provide different types of knowledge information than first level TIS sources. Second level TIS(s) typically provide metadata and/or usage data about a data resource. The knowledge information provided by the second level TISs can be in a variety of formats, ranging from structured data reports to unstructured documents and email messages, in examples. Examples of second-level TIS(s) include "whois" systems that provide metadata for domain name data resources, geolocation databases that provide country and locale data in response to a requested IP address data resource, and "traceroute" tools that provide traffic path trace information in response to a requested IP address data resource.

The knowledge information provided by second level TIS(s) does not necessarily indicate that the data resource is a known threat or is associated with suspicious activity. However, taken as a whole, the knowledge information can spot trends in usage of otherwise "good" data resources that may indicate suspicious activity and therefore potential trends. For example, an IP address data resource that is not identified as a known threat after a lookup against a first level TIS (e.g. a "good" IP address data resource) may still be associated with suspicious traffic activity. Specifically, an otherwise "good" IP address data resource may be included in knowledge information obtained from a second level TIS "whois" repository for a suspect domain name, where the domain name data resource included in the "whois" query has been recently associated with Distributed Denial of Service (DDoS) attacks in multiple countries.

The present invention improves upon current incident management systems. An Incident Manager collaboration tool (IM) of the present invention can consume a variety of cyber threat intelligence information for data security incidents, and can track cyber attack activities and detect trends across the data security incidents. In one example, the IM tracks the data security incidents by creating incident objects that include information for the incidents, creating incident artifacts (IAs) for data resources identified within the incident objects, and saving the incident objects and IAs to an incident database. The stored incident objects and IAs are then available for future reference.

IRT personnel can then lookup details of the tracked incidents, such as the IAs, against first and second level TIS(s) to obtain information about data security incidents that current incident response systems and methods cannot provide. In one example, the IM can correlate the information obtained from the lookups of the IAs against the first and second level TISs to infer malicious activities, suspect behaviors, and potential trends. By executing these actions across a large number of IAs and threat intelligence sources, IRT members using the IM can detect trends across the data security incidents, and rapidly gain insight about suspicious activities that current incident management systems cannot provide and that IRT members cannot obtain manually.

In general, according to one aspect, the invention features a method for tracking data security incidents in an enterprise network. The method comprises creating, in an incident manager (IM), incident objects that include information for the data security incidents and incident artifacts (IAs) that include information for data resources identified within the incident objects, looking up the IAs in one or more external threat intelligence sources (TIS(s)) to obtain knowledge information concerning the IAs, and augmenting the IAs with the knowledge information concerning the IAs obtained from the TIS(s).

In one example, the creation of the incident objects and the incident artifacts is accomplished by the IM in response to receiving messages sent from devices in the enterprise network, wherein the messages include the information for the data security incidents. In another example, creating the incident objects and the incident artifacts is accomplished by Incident Response Team (IRT) personnel of the enterprise network in response to the data security incidents. The IRT personnel of the enterprise network preferably augment the IAs to include information concerning the IAs.

Preferably, looking up the IAs in the one or more external TIS(s) further comprises querying first level TIS(s) to identify whether the IAs are associated with known threats, and querying second level TIS(s) to provide metadata and/or usage data for the IAs.

In one implementation, the method executes rules associated with the known threats to provide an incident response to the data security incidents. Typically, the method correlates the created incident objects and the augmented IAs, with other incident objects and IAs stored in the IM associated with other data security incidents, to identify potential trends in the correlated data. Then, the method executes rules associated with the identified potential trends to provide an incident response to the data security incidents.

Typically, the incident objects and the incident artifacts are stored in an incident database included within the IM. In examples, the data resources identified within the incident objects include Internet Protocol (IP) addresses, file hashes associated with malware, domain names, names of files, user account IDs, registry keys, email addresses, and/or protocol port numbers.

In examples, the external TIS(s) include first level TIS(s) of known threats including IP address blacklist and malware hash information, and include second level TIS(s) including whois, geolocation, and traceroute information.

In general, according to another aspect, the invention features an incident response system for tracking data security incidents in an enterprise network. The system includes one or more external threat intelligence sources (TIS(s)) that respond to queries with knowledge information concerning requested data resources, and an incident manager (IM).

The incident manager (IM) can store incident objects and incident artifacts (IAs) created in response to the data security incidents, wherein the incident objects include information for the data security incidents and the IAs include information for data resources identified within the incident objects. The IM also provides the IAs as the requested data resources in queries to the one or more external threat information sources to obtain knowledge information concerning the IAs, and augments the IAs with the knowledge information concerning the IAs obtained from the one or more external threat information sources.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 shows how the IM executes an incident response for data resources that the IM identifies from the information of the data security incident, and where the IM queries first level TISs to determine whether the data resources are associated with known threats;

FIG. 6 shows how the IM queries second level TISs; FIG. 7 shows how the IM executes an incident response for potential trends that the IM identifies from correlating the information of the data security incident with information obtained from the second level TISs and with information stored on the IM associated with other data security incidents.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
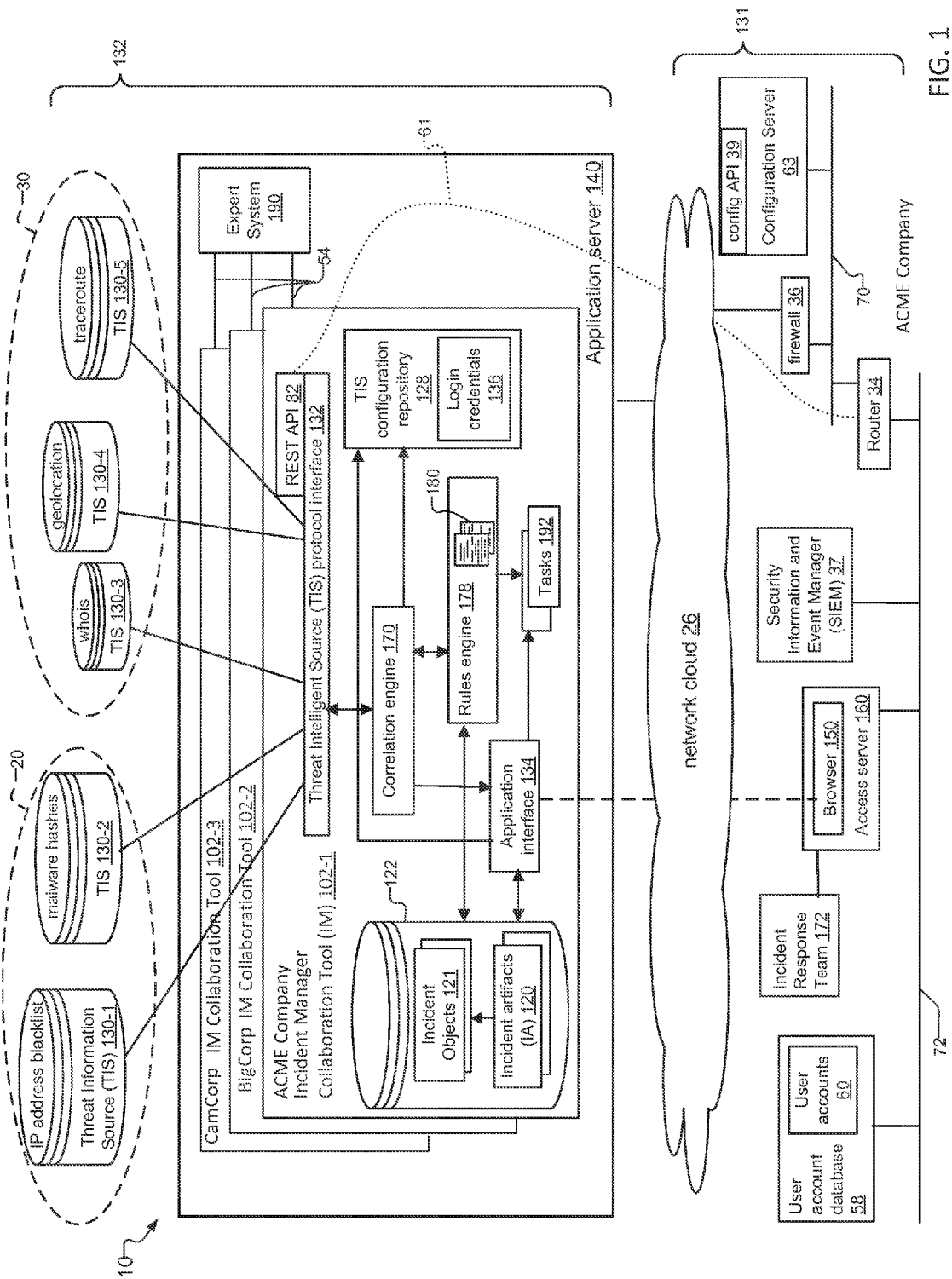
FIG. 1 is a system block diagram of an incident management system that includes a cloud embodiment of an incident manager collaboration tool (IM) to which the present invention relates, where one or more IMs are included within a service network and each IM manages the incident response for a separate client enterprise network.

FIG. 1 shows a cloud embodiment of one or more incident manager collaboration tool applications (IM) 102 within an incident management system 10. Preferably, an IM 102 is implemented an internet-accessible managed service such as a Software as a Service (SaaS) application. The IMs 102 are hosted within an application server 140. The application server 140 is included within a service network 132.

IM(s) 102-1, 102-2, and 102-3 manage the incident response for enterprise networks 131 of exemplary organizations ACME Company, BigCorp, and CamCorp, respectively. The enterprise network 131 of ACME Company is shown. The application server 140 provides security and mutual exclusion of the data for each IM 102. Each IM 102 communicates with its associated enterprise network 131 over a network cloud 26.

The enterprise network 131 of each organization includes a number of devices. These include computing devices, database systems, and data networking devices such as routers 34 firewalls 36 and configuration servers 63, in examples. The enterprise network 131 typically connects to the network cloud 26 via a firewall 36 device. The firewall 36 typically provides a single point of connection for each organization's enterprise network 131 to the network cloud 26. The network cloud 26 can be a private network, or a public network such as the Internet, in examples. The configuration server 63 includes a config API 39 that enables an external client such as the IM 102 to execute actions on devices within the client's enterprise network 131. Preferably, via its config API 39, the configuration server 63 acts as a proxy for the IM 102 to execute actions on remote devices in the enterprise networks 131 of the clients.

In the example enterprise network 131 for ACME Company, the firewall 36 also typically connects to a corporate network 70 of the enterprise network 131. A router 34 connects the corporate network 70 to a local network 72. The local network 72 also includes devices such as a user account database 58 including user accounts 60, and access server 160 including a web browser 150, and a security information and event manager (SIEM) 37.

Personnel typically associated with an Incident Response Team ("IRT") 172 access the IM 102 via the browser 150. The browser 150, in one example, presents a graphical user interface (GUI) application for managing and interacting with the IM 102.

The members of the IRT 172 can also communicate with the IM 102 using web browsers 150 or stand-alone applications running on user devices such as tablet devices, where the application server 140 additionally functions as a web server.

The IM 102 includes an application interface 134 that provides access to the IM 102 for users such as IRT personnel 172. The IM 102 also includes an incident database 122 that stores incident objects 121 and incident artifacts (IAs) 120, a correlation engine 170, and a rules engine 178 that includes rules 180. The IM 102 also includes a Threat Intelligence Source (TIS) protocol interface 132, and a TIS configuration repository 128. A REST (REpresentational State Transfer) API 82 sits on top of the TIS protocol interface 132.

REST is a simple client/server based way to organize interactions between independent systems. The REST API 82 enables specific two-way communications between the IM 102 and external devices in the enterprise network 131 that do not otherwise have access to the IM's more feature rich application interface 134. In the current implementation, the REST API 82 is typically limited to providing the ability for external systems to create incident objects 121 and IAs 120 in the IM 120. An example REST connection between the router 34 and the IM 102 via the REST API 82 is indicated by reference 61.

External TIS(s) such as first level TIS(s) 20 and second level TIS(s) 30 communicate with each IM 102 via its TIS protocol interface 132. In one example, TIS(s) include files that in turn include the threat data resources, and the IMs 102 periodically download the files from the TIS(s). In another example, after IAs 120 are recorded by the IM 102, the IM 102 reads the contents of the recorded IAs. If the recorded IA 120 includes any threat data resources, the IM 102 issues real-time queries to an Application Programming Interface (API) of one or more TIS(s) to obtain more information about the threat data resources.

First level TIS(s) 20 include IP address blacklist TIS(s) 130-1 that include IP address known threats, and malware hash TIS(s) 130-2 that include hashes/signatures for malware known threats, in examples. Second-level TIS(s) 30 include "whois" TIS(s) 130-3 that provide metadata for requested domain name data resources, geolocation TIS(s) 130-4 that provide country and locale data in response to a requested IP address data resource, and "traceroute" TIS(s) 130-5 that provide traffic path trace information in response to a requested IP address data resource, in examples. Login credentials 136 for accessing each TIS(s) 130 are included within the TIS configuration repository 128.

System managers within the service network 132 use an expert system 190 to create, configure, and update the IM(s) 102 for all managed client organizations. Via the expert system 190, service managers can update the capabilities of each IM 102 and update the services each IM 102 provides to its clients.

In the current embodiment, the expert system 190 is an application running within the application server 140. The expert system 190 allows system managers to send management information 54 to individual IMs and/or across multiple IMs 102 at once. The management information 54 typically includes control messages and associated data for configuring the IMs and updating its software components. In one example, to enhance or restrict client access to data and resources provided by an IM 102, system managers send management information 54 that includes instructions and executable software for updating the application interface 134 of the IM 102.

The rules engine 178 generates a list of tasks 192 for an IM 102 or IRT personnel 172 to execute in response to data security incidents. The tasks 192 include recommended actions that should be taken to provide an incident response to the data security incidents. Note that the rules engine 178 can also be programmed to automatically execute actions in response to incidents, such as instructing the firewall 36 to block access to certain IP addresses or suspicious protocol ports in response to a data security incident. In other examples, the expert system 190 can also provide the same functions as the rules engine 178 on behalf of each organization that it manages.

The incident database 122 includes incident objects 121 and incident artifacts (IAs) 120. The incident objects 121 include information for the data security incidents and the IAs 120 include information for data resources identified within the incident objects 121.

The IAs 120 can have a one-to-many relationship with the incident objects 121 and can be edited/augmented by IRT personnel 172 or the IM 102 to include new information. For example, when the IM 102 identifies an IP address data resource within a newly created incident object 121, the IM 102 can first search the incident database 122 to determine if an IA 120 for the same IP address data resource already exists. If the IA 120 already exists, the IM 102 can "link" or associate the existing IA 120 with the newly created incident object 121. The IM 102 can then annotate the existing IA 120 with information obtained from the newly created incident object 121. Moreover, the fact that the same IA 120 is linked with multiple incidents (e.g. multiple incident objects 121) is also a useful indicator of a pattern or trend when analyzing incidents.

In a specific example, an IRT member 172 creates an incident object 121 within the IM 102 for an incident that occurred in an enterprise network 131. The incident object 121 includes a suspicious IP address data resource, "1.1.1.1." The IM 102 parses the incident object 121, identifies IP address 1.1.1.1 as a data resource, and creates an IA 120 for the identified IP address data resource (e.g. 1.1.1.1) and saves the IA 120 to the incident database 122. Then, the IM 102 executes a lookup of the IA 120 for IP address 1.1.1.1 against a first level TIS(s) 20 such as an IP address blacklist TIS 130-1 to determine whether the IP address is a known threat. In response to the determination, the IM 102 follows a pre-determined set of rules 180 in the rules engine 178 and can then recommend a course of action for IRT personnel 172 to follow in response to the determination of the threat.

Then, the IM 102 can additionally lookup the IA 120 for IP address 1.1.1.1 against one or more second level TIS(s) 30 to obtain metadata and usage data for the IP address. The metadata and usage data obtained can be used separately from or in conjunction with the information obtained from the lookup of the IA 120 against the first level TIS(s) 20. In an example, while the IA for IP address 1.1.1.1 may not be associated with a known threat in the IP address blacklist first level TIS 130-1, the same IA 120/IP address 1.1.1.1 could be included as a spoofed source IP address within a suspicious data traffic trace entry hosted by traceroute second level TIS 130-5. IRT members 172 or the IM 102 itself can then annotate the IA 120 for IP address 1.1.1.1 to reflect this potential trend information. This improves both the cyber threat knowledge that the IM 102 provides and the ability of the IM 102 to detect and predict future cyber threats.

It is also important to note that in addition to IRT personnel 172 creating the incident objects 121 and incident artifacts 120 in response to incidents, the IM 102 itself can also create the incident objects 121 and the incident artifacts 120 in response to receiving messages sent from devices in the enterprise network 131 such as the firewall 36. The messages include the information for the data security incidents. The IM 102 extracts the information for the data security incidents from the messages and include the information within the incident objects 121 and IAs 120. In one example, the messages can include the contents of data packets sent between devices communicating over the enterprise network 131 that has been captured by a data traffic capture application.

Figure 2:
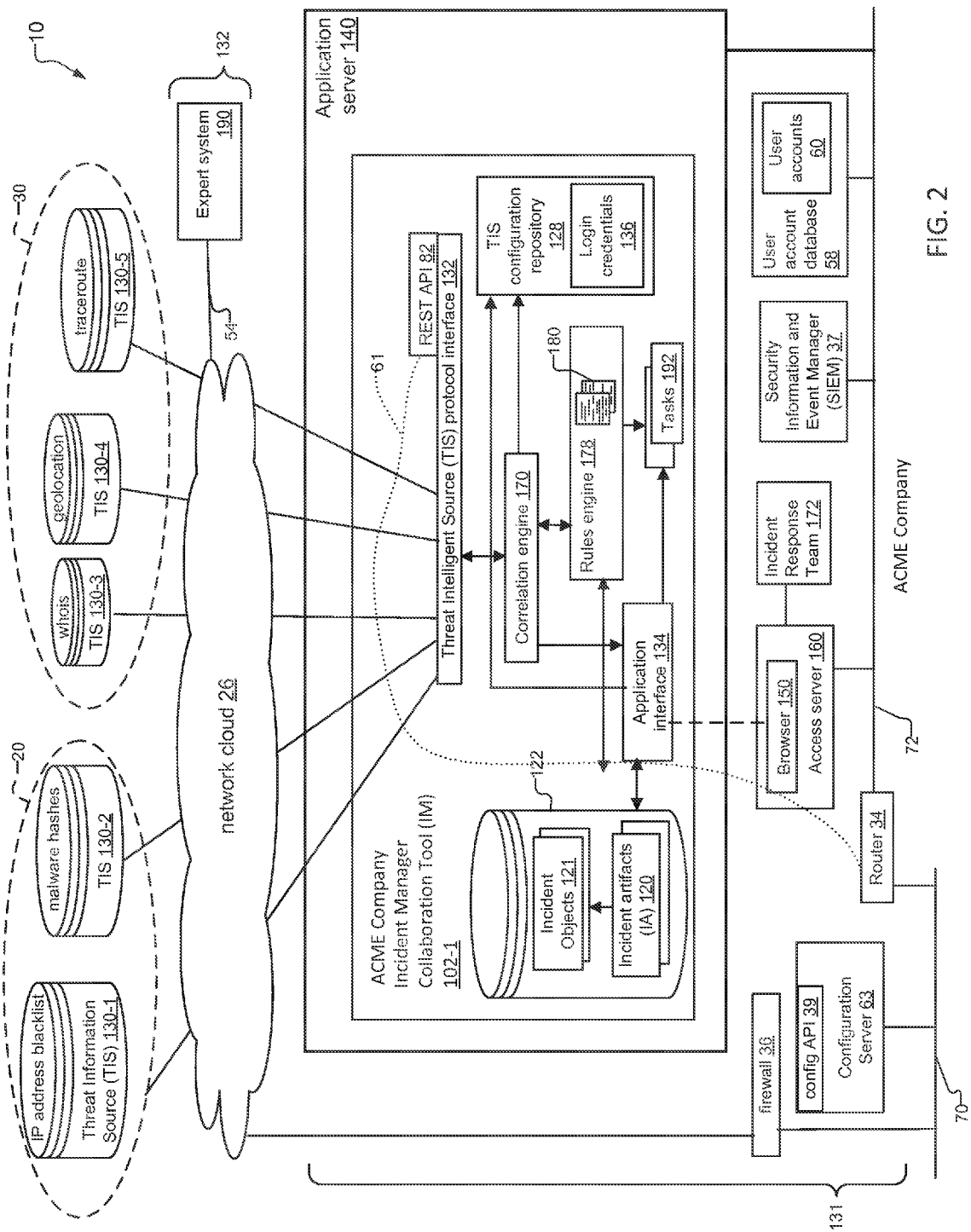
FIG. 2 is a system block diagram of an incident management system including an on-premises embodiment of an IM, where the IM is included within the client enterprise network for which the IM manages the incident response.

FIG. 2 shows a system diagram of an "on premises" preferred embodiment of an IM 102 within an incident management system 10. The IM 102 is hosted on an application server 140 included within each enterprise network 131 for which the IM 102 tracks the data security incidents.

This embodiment provides local access to the IM 102 for IRT personnel 172 of the enterprise network 131. In one example, the service network 132 in the preferred embodiment is limited to the expert system 190 for communicating with each organization's IM 102 via its TIS protocol interface 132.

Figure 3:
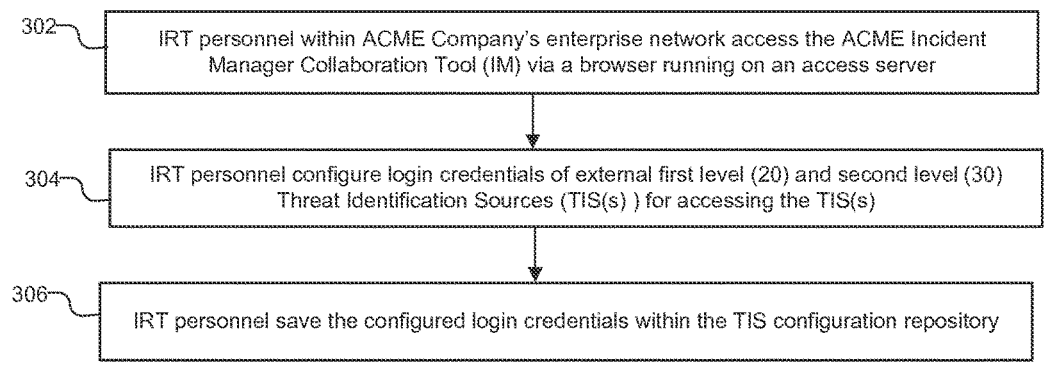
FIG. 3 is a flow diagram that shows how Incident Response Team (IRT) personnel configure login credentials of TIS(s) within an IM, where the IM manages the incident response for exemplary enterprise network client ACME Company.

FIG. 3 is an example method for configuring login credentials 136 to enable an IM 102 to access TIS(s) 130.

IRT personnel 172 within ACME Company's enterprise network 131 access the ACME (IM) 102 via a browser 150 running on the application server 140, in step 302. Then, in step 304, IRT personnel 172 configure login credentials 136 of external first level 20 TIS(s) 130-1 and 130-2 and second level 30 TIS(s) 130-3 through 130-5. In step 306, The IRT personnel 172 save the configured login credentials 136 to the TIS configuration repository 128 of the IM 102.

Figure 4:
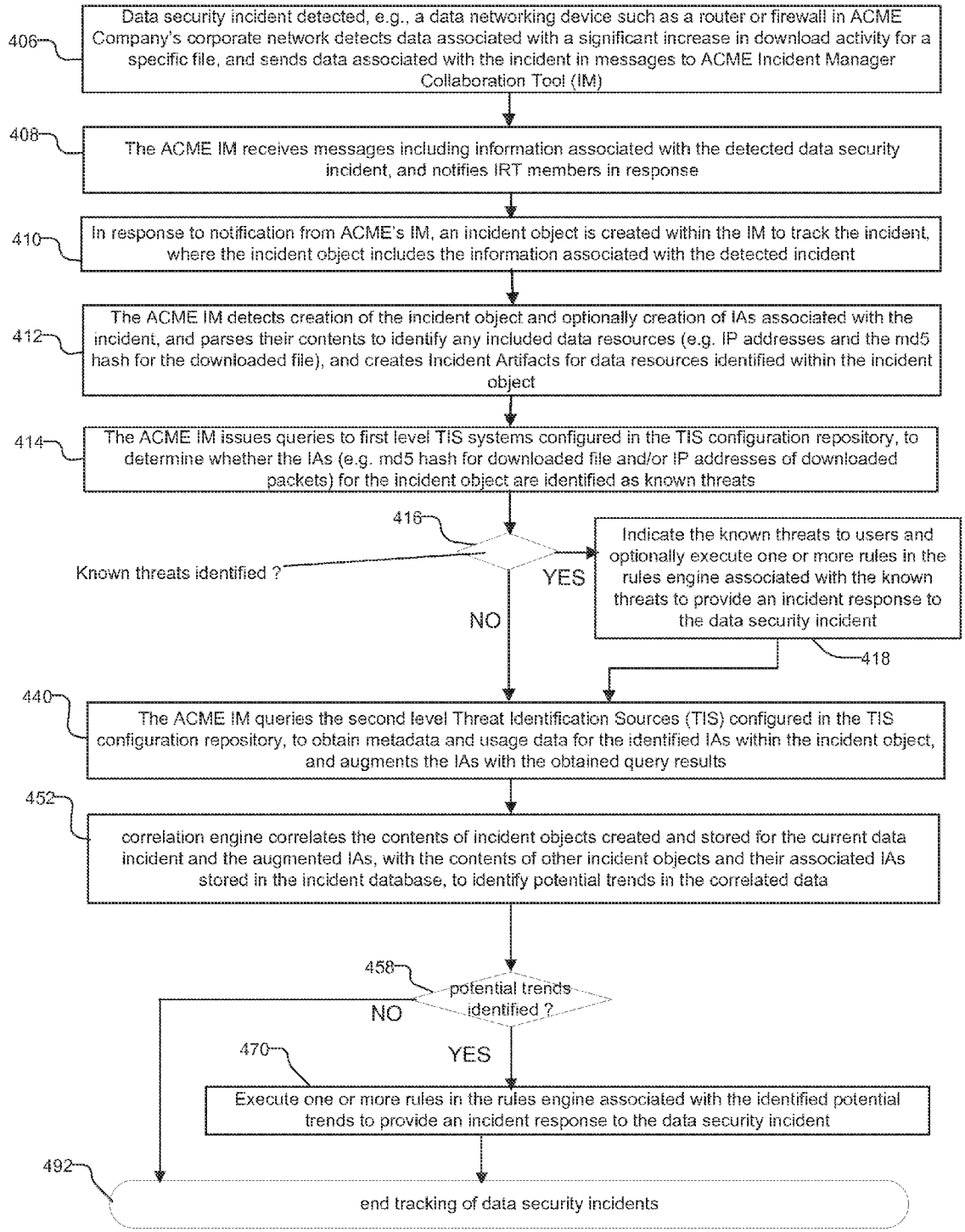
FIG. 4 is a flow diagram that shows how the IM for the enterprise network of ACME Company provides an incident response for a suspicious file download data security incident, where the suspicious file download is detected by a device within ACME Company's enterprise network.

FIG. 4 provides an example for how the IM 102 tracks data security incidents.

In step 406, a data security incident is detected, e.g., a data networking device such as a router 34 or firewall 36 in ACME Company's corporate network 70 detects data associated with a significant increase in download activity for a specific file, and sends data associated with the incident in messages to the ACME IM 102-1.

According to step 408, the ACME IM 102-1 receives messages including information associated with the detected data security incident, and notifies IRT 172 members in response.

In step 410, in response to notification from ACME's IM 102, an incident object 121 is created within the IM 102 to track the data security incident. In one example, the IM 102 automatically creates the incident object 121 in response to receiving the messages including the information associated with the detected data security incident. In another example, IRT personnel 172 create the incident objects 121 manually within the IM 102 via the application interface 134.

In step 412, the ACME IM 102 detects creation of the incident object 121 and optionally creation of IAs 120 associated with the incident, and parses their contents to identify any included data resources (e.g. IP addresses and the md5 hash for the downloaded file) within the incident object 121, and creates IAs 120 for the data resources identified within the incident object 121. As in step 410 for the creation of the incident objects 121, the IAs 120 can be created automatically by the IM 102 or manually by the IRT personnel 172. The IAs can also be created or added at a later time. Then, in step 414, the ACME IM 102-1 issues queries to first level TIS(s) 20 configured in the TIS configuration repository 128, to determine whether the IAs 120 (e.g. md5 hash for downloaded file and/or IP addresses of downloaded packets) for the incident object 121 are identified as known threats.

According to step 416, if any known threats are identified, the method transitions to step 418. In step 418, the IM 102 indicates this condition to the users of the IM 102 and optionally executes rules 180 in the rules engine 178 associated with the known threats to provide an incident response to the data security incident. The method transitions to step 440 upon conclusion of step 418, and also when if no actual threats are identified in step 416.

Figure 5:
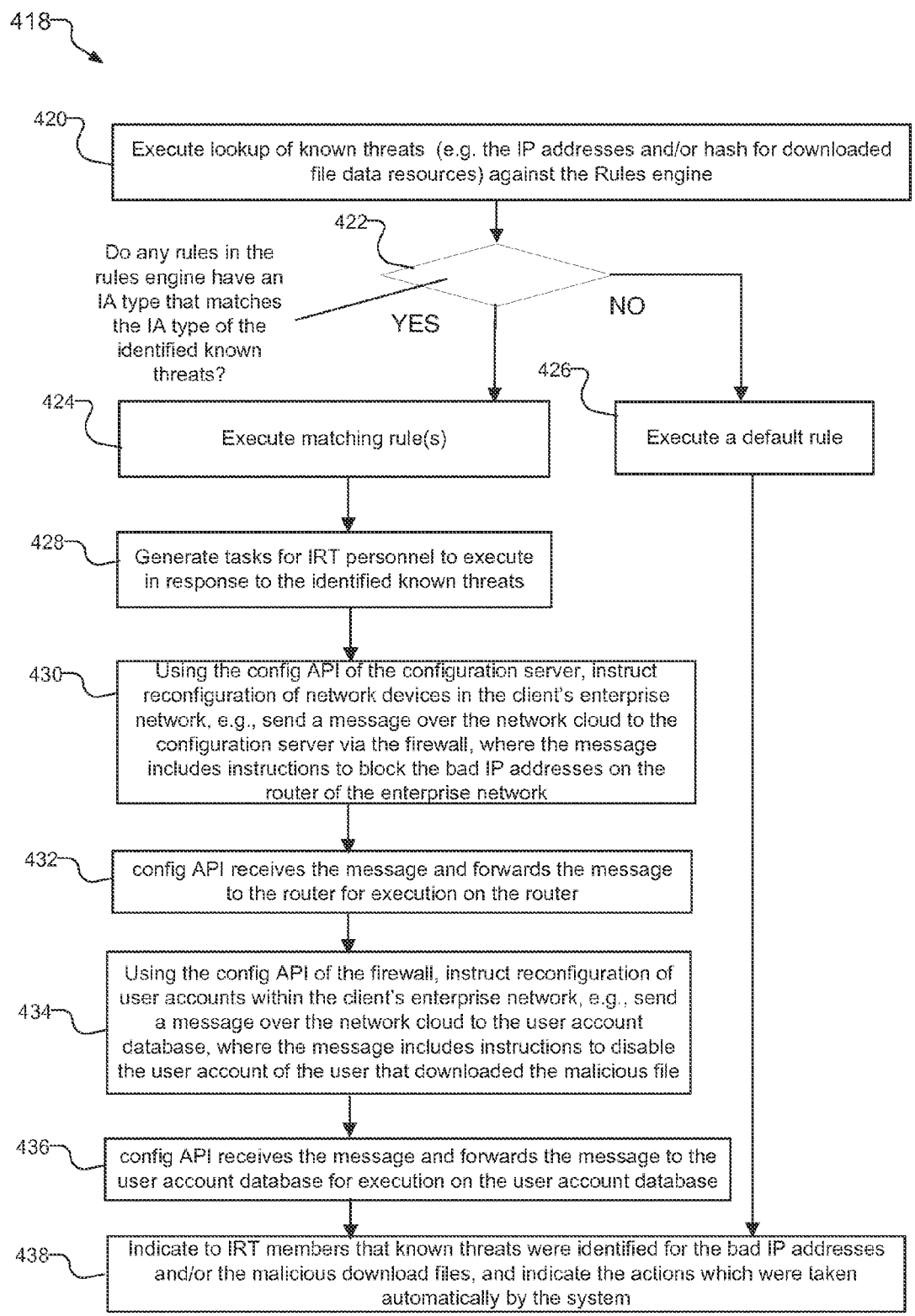
FIG. 5 is a flow diagram that provides more detail for the flow diagram of FIG. 4, where

FIG. 5 provides detail for step 418 of FIG. 4.

In step 420, the IM 102 executes a lookup of known threats (e.g. the IP addresses and/or hash for downloaded file data resources) against the Rules engine 178. If any rules 180 in the rules engine 178 have an IA type that matches the IA type of the known threats in step 422, the method transitions to step 424 and executes the matching rules. Otherwise, the method executes a default rule in step 426 and transitions to step 434.

Steps 428 through 432 describe exemplary actions for the matching rules executed in step 424.

In step 428, the IM 102 generates tasks 192 for IRT personnel 172 to execute in response to the identified known threats. According to step 430, using the configAPI 39 of the configuration server 63, the IM 102 instructs reconfiguration of network devices within the client's enterprise network 131, e.g., send a message over the network cloud 26 to the configuration server 63 via the firewall 36, where the message includes instructions to block the bad IP addresses on the router 34 of the enterprise network 131. The config API 39 receives the message and forwards the message to the router 34 for execution on the router 34 in step 432, in one example.

In step 434, using the config API 39 of the configuration server 63, the IM 102 instructs reconfiguration of user accounts 60 within the client's enterprise network 131, e.g., send a message over the network cloud 26 to the user account database 58, where the message includes instructions to disable the user account 60 of the user that downloaded the malicious file. The config API 39 receives the message and forwards the message to the user account database 58 for execution on the user account database 58 in step 436, in another aspect of this example.

Finally, in step 438, the IM 102 indicates to IRT members 172 that known threats were identified for the bad IP addresses and/or the malicious download files, and indicate the actions which were taken automatically by the system. Note that step 438 is reached upon conclusion of both steps 426 and 436.

Returning to FIG. 4, in step 440, the ACME IM 102 queries the second level TIS(s) 30 configured in the TIS configuration repository 128, to obtain metadata and usage data for the identified IAs 120 within the incident object 121, and augments the IAs 120 with the obtained query results.

Figure 6:
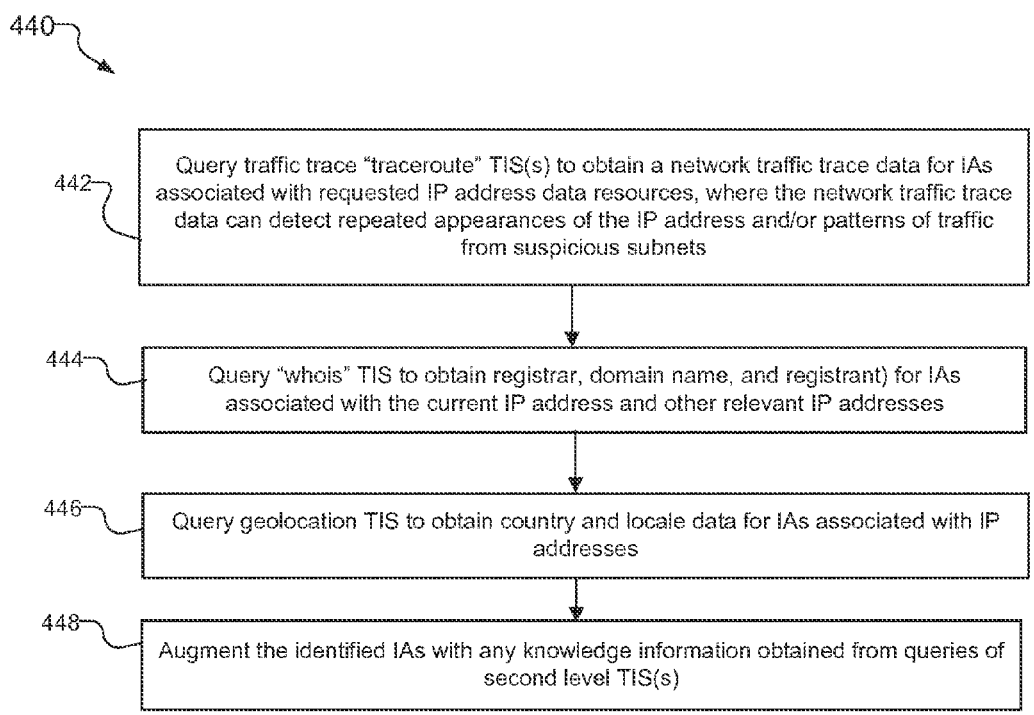
FIG. 6 is a flow diagram that provides more detail for the flow diagram of FIG. 4, where

FIG. 6 provides detail for step 440 of FIG. 4.

In step 442, the IM 102 queries a traffic trace "traceroute" TIS 130-5 to obtain network traffic trace data for IA 120s associated with requested IP address data resources, where the network traffic trace data can detect repeated appearances of the IP address and/or patterns of traffic from suspicious subnets, in one example. In step 444, the IM 102 queries a "whois" TIS 130-3 to obtain registrar, domain name, and registrant information for IAs 120 associated with the current IP address and other relevant IP addresses. According to step 446, the IM 102 queries a geolocation TIS 130-4 to obtain country and locale data for IAs associated with IP addresses. Finally, in step 448, the IM 102 augments the identified IAs 120 with any knowledge information obtained from the queries of the second level TIS(s) 30.

Returning to FIG. 4, in step 452, the correlation engine 170 correlates the contents of incident objects 121 created and stored for the current data security incident and the augmented IAs 120, with other incident objects 121 and their associated IAs 121 stored in the incident database 122, to identify potential trends in the correlated data. In one example, the correlation includes searching for common attributes among the incident objects 121 and their IAs 120, and identifying any statistically significant correlations across the incident objects 121 and the IAs 120.

The other incident objects 121 and their associated IAs 120 include details of other incidents of many different types and that occurred at different times. Though the various incidents for which the incident objects 121 and IAs 120 were created may appear at first glance to be independent or unrelated, trends across the incident objects 121 and IAs 120 can be obtained by comparing and contrasting their contents collectively.

If any potential trends were identified in step 458, the method transitions to step 470. Otherwise, the incident response method terminates in step 492 to end the tracking of the data security incidents.

Figure 7:
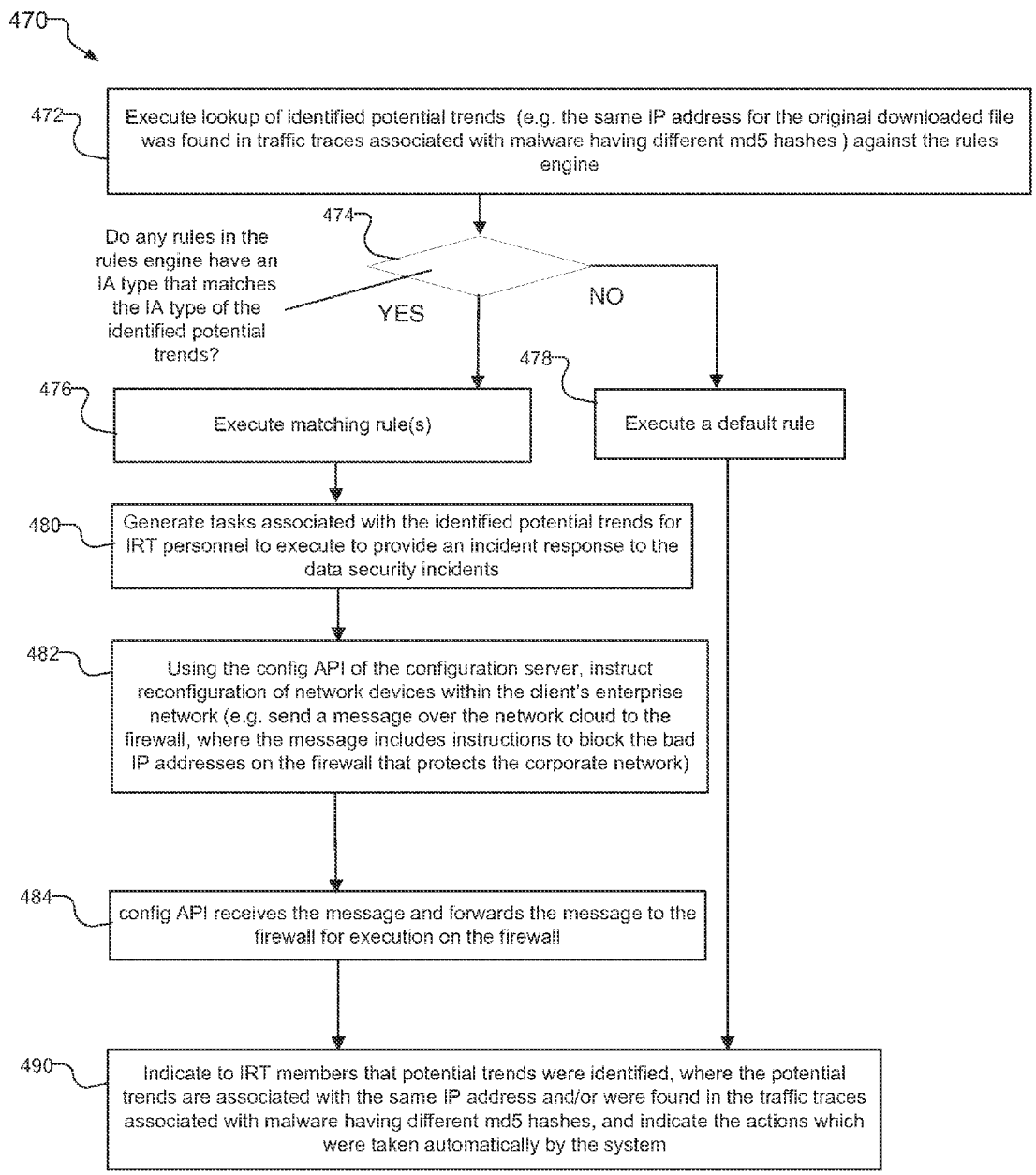
FIG. 7 is a flow diagram that provides more detail for the flow diagram of FIG. 4, where

FIG. 7 provides detail for step 470 of FIG. 4.

In step 472, the IM 102 executes a lookup of identified potential trends (e.g. the same IP address for the original downloaded file was found in traffic traces associated with malware having different md5 hashes) against the rules engine 178. If any rules 180 in the rules engine 178 have an IA type that matches the IA type of the identified potential trends in step 474, the method transitions to step 476 and executes the matching rules. Otherwise, the method executes a default rule in step 478 and transitions to step 490.

Steps 480 through 484 describe exemplary actions for the matching rules executed in step 476.

In step 480, the IM 102 generates tasks 192 associated with the identified potential trends for IRT personnel 172 to execute to provide an incident response to the data security incidents. According to step 482, using the configAPI 39 of the of the configuration server 63, the IM 102 instructs reconfiguration of network devices within the client's enterprise network 131, e.g., send a message over the network cloud 26 to the firewall 36, where the message includes instructions to block the bad IP addresses on the firewall 36 that protects the corporate network 70 of the enterprise network 131. The config API 39 receives the message, and forwards the message to the firewall 36 for execution on the firewall 36 in step 484.

Finally, in step 490, the IM 102 indicates to IRT members 172 that potential trends were identified, where the potential trends are associated with the same bad IP addresses and/or the malicious download files identified in step 472, and indicate the actions which were taken automatically by the system. Note that step 490 is reached upon conclusion of both steps 484 and 478.

Returning to FIG. 4, the IM 102 completes its tracking of data security incidents in step 492.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for tracking data security incidents in an enterprise network, the method comprising:
   creating, in an incident manager (IM), incident objects that include information for the data security incidents and incident artifacts (IAs) that include information for data resources identified within the incident objects, wherein an IA is distinct from an incident object, wherein upon a determination that a newly-created incident object includes a data security incident associated with an existing data resource, an existing IA associated with that existing data resource is linked to the newly-created incident object, such that different incident objects can then refer to the same IA;
   looking up the IAs in one or more external threat intelligence sources (TIS(s)) to obtain knowledge information concerning the IAs, wherein at least one external TIS is a file accessible via a software interface, and wherein looking up the IAs comprises querying one or more first level TIS(s) to identify whether the IAs are associated with known threats, and querying one or more second level TIS(s) to provide metadata and/or usage data for the IAs;

augmenting the IAs with the knowledge information concerning the IAs obtained from the TIS(s); and executing rules associated with the known threats to provide an incident response to the data security incidents.

2. The method of claim 1, wherein creating the incident objects and the incident artifacts is accomplished by the IM in response to receiving messages sent from devices in the enterprise network, wherein the messages include the information for the data security incidents.

3. The method of claim 1, wherein creating the incident objects and the incident artifacts, is accomplished by receiving information from Incident Response Team (IRT) personnel of the enterprise network in response to the data security incidents.

4. The method of claim 1, further comprising receiving information from Incident Response Team (IRT) personnel of the enterprise network augmenting the IAs to include information concerning the IAs.

5. The method of claim 1, further comprising correlating the created incident objects and the augmented IAs, with other incident objects and IAs stored in the IM associated with other data security incidents, to identify potential trends in the correlated data.

6. The method of claim 5, further comprising executing rules associated with the identified potential trends to provide an incident response to the data security incidents.

7. The method of claim 1, further comprising storing the incident objects and the IAs in an incident database included within the IM.

8. The method of claim 1, wherein the data resources identified within the incident objects include Internet Protocol (IP) addresses, file hashes associated with malware, domain names, names of files, user account IDs, registry keys, email addresses, and/or protocol port numbers.

9. The method of claim 1, wherein the external TIS(s) include first level TIS(s) of known threats including IP address blacklist and malware hash information.

10. The method of claim 1, wherein the external TIS(s) include second level TIS(s) including whois, geolocation, and traceroute information.

11. An incident response system for tracking data security incidents in an enterprise network, comprising:

one or more external threat intelligence sources (TIS(s)) that respond to queries with knowledge information concerning requested data resources, wherein at least one external TIS is a file accessible via a software interface; and an incident manager (IM) that:

stores incident objects and incident artifacts (IAs) created in response to the data security incidents, wherein the incident objects include information for the data security incidents and the IAs include information for data resources identified within the incident objects, wherein an IA is distinct from an incident object, and wherein upon a determination that a newly-created incident object includes a data security incident associated with an existing data resource, an existing IA associated with that existing data resource is linked to the newly-created incident object, such that different incident objects can then refer to the same IA;

provides the IAs as the requested data resources in queries to the one or more external threat information sources to obtain knowledge information concerning the IAs, wherein the external TIS(s) include one or more first level TIS(s) that provide an indication whether the IAs are associated with known threats, and one or more second level TIS(s) that provide metadata and/or usage data for the IAs;

augments the IAs with the knowledge information concerning the IAs obtained from the one or more external threat information sources; and execute rules associated with the known threats to provide an incident response to the data security incidents.

12. The system of claim 11, wherein the information for the data security incidents are included within messages sent from devices in the enterprise network, and wherein the IM creates the incident objects and the IAs in response to receiving the messages.

13. The system of claim 11, wherein the IM receives information from Incident Response Team (IRT) personnel of the enterprise network create the incident objects and the IAs in response to the data security incidents.

14. The system of claim 11, further comprising the IM receiving information from Incident Response Team (IRT) personnel of the enterprise network augmenting the IAs with information concerning the IAs.

15. The system of claim 11, wherein the IM includes a correlation engine that correlates the stored incident objects and the augmented IAs with other incident objects and IAs stored in the IM to identify potential trends in the correlated data.

16. The system of claim 11, wherein the IM includes a rules engine including rules, and wherein the rules engine executes rules associated with the identified potential trends to provide an incident response to the data security incidents.

17. The system of claim 11, wherein the IM includes an incident database that stores the incident objects and the IAs.

18. The system of claim 11, wherein the data resources identified within the incident objects include Internet Protocol (IP) addresses, file hashes associated with malware, domain names, names of files, user account IDs, registry keys, email addresses, and/or protocol port numbers.

19. The system of claim 11, wherein the external TIS(s) include first level TIS(s) including IP address blacklist and malware hash information.

20. The system of claim 11, wherein the external TIS(s) include second level TIS(s) including whois, geolocation, and traceroute information.

* * * * *